US006880877B2

(12) United States Patent
Sawayanagi et al.

(10) Patent No.: US 6,880,877 B2
(45) Date of Patent: Apr. 19, 2005

(54) BRACKET COUPLING STRUCTURE

(75) Inventors: Masahiro Sawayanagi, Shizuoka-ken (JP); Mitsuyoshi Ohono, Aichi-ken (JP); Kiyotaka Akama, Aichi-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/667,480

(22) Filed: Sep. 23, 2003

(65) Prior Publication Data

US 2004/0124656 A1 Jul. 1, 2004

(30) Foreign Application Priority Data

Sep. 24, 2002 (JP) .................................... P2002-277814
Sep. 24, 2002 (JP) .................................... P2002-277822

(51) Int. Cl.[7] .................................................. B60J 3/00
(52) U.S. Cl. ................................. 296/97.9; 248/222.12
(58) Field of Search .............................. 296/97.9, 78.1; 248/222.12, 222.51, 222.52

(56) References Cited

U.S. PATENT DOCUMENTS 2,909,352 A * 10/1959 Buren, Jr. ................... 248/239
5,407,363 A * 4/1995 Polgar et al. ............... 439/546
5,765,897 A * 6/1998 Snyder et al. ............. 296/97.9
6,511,116 B1 * 1/2003 De Jongh et al. .......... 296/97.9

FOREIGN PATENT DOCUMENTS

JP 5-72076 9/1993
JP 7-288160 10/1995

* cited by examiner

*Primary Examiner*—Dennis H. Pedder
(74) *Attorney, Agent, or Firm*—Finnegan, Henderson, Farabow, Garrett, & Dunner, L.L.P.

(57) ABSTRACT

A bracket coupling structure is disclosed having hook portions 8, disposed on two positions of a base plate 5 of a panel-side bracket 2, and having L-shape cross sections directed outward, respectively, with respect to a rotation center wherein under a condition in which the hook portions 8 are inserted to a mounting opening 30 of a trim 4, the panel-side bracket 2 is rotated in a mounting rotational direction to cause the hook portions 8 to engage a peripheral edge of the mounting opening 30 for permitting the panel-side bracket 2 to be fixed to the trim 4. Disposed on leading ends, facing the mounting rotational direction, of the hook portions 8, respectively, are resilient catch-up blades 15 each of which is sloped in a direction to be separate away from the base plate 5 toward an upstream of the mounting rotational direction.

14 Claims, 17 Drawing Sheets

BRACKET COUPLING STRUCTURE

BACKGROUND OF THE INVENTION

The present invention relates to bracket coupling structures and, more particularly, to a bracket coupling structure useful when fixedly securing an auxiliary unit, such as a sunvisor to be installed inside a vehicle, to a panel.

FIGS. 1 to 3 shows a bracket structure disclosed in Japanese Patent Provisional Publication No. 7-288160. Formed on side surfaces 102*a* of a bracket 100 formed in a square shape, respectively, are base plate protrusions 101 that protrude at appropriate positions in trailing areas in an insertion direction A and hook portions 102 that protrude at appropriate positions in leading areas in the insertion direction A. An engagement claw segment 103 formed at one end of each base plate protrusion 101 protrudes toward each hook portion 102. Also, formed on side surfaces 100*a* of the bracket 100 along the insertion direction A is a rotation limit protrusions 104. The that protrude at appropriate positions in trailing areas in an insertion direction A has both ends connected to one end of the base plate protrusion 101 and one end of the hook portion 102 (see FIG. 1).

In the meantime, formed on a peripheral edge of a mounting opening 106 formed in a panel 105 are hook insertion bores 107, which permit the hook portions 102 to be inserted, and a positioning bore 108 (see FIG. 2).

Next, description is made of a sequence of assembling the bracket 100. First, the hook portions 102 of the bracket 100 are positioned in alignment with the hook insertion bores 107 of the mounting opening 106 of the panel 100 and the bracket 100 is inserted to the mounting opening 106 of the panel 105. Subsequently, the bracket 100 continues to be inserted until the base plate protrusions 101 abut the peripheral edge of the mounting opening 106 of the panel 105. Then, the bracket 100 is rotationally operated until the engagement claw segment 103 is brought into mating engagement with the positioning bore 108, and mounting operation is completed. When attempt is made to rotate the bracket to an area far from such a rotating complete position, the rotation limit protrusion 104 is brought into abutting engagement with an end face 107*a* of the hook insertion bore 107. Thus, excessive rotation of the bracket 100 is avoided.

At the rotating complete position, the bracket 100 is fixed to the panel 105 under a situation in which the peripheral edge of the mounting opening 106 of the panel 105 is sandwiched between the base plate protrusion 101 of the bracket 100 and the hook portions 102 (see FIG. 3).

With the above-described bracket coupling structure, if a thickness T of the panel 105 is less than a deviation dimension D between the base plate protrusion 101 and the hook portions 102 ($T \leqq D$), the bracket 100 is allowed to be rotated.

SUMMARY OF THE INVENTION

However, since the thickness T of the panel 105 is thicker than the deviation dimension D between the base plate protrusion 101 and the hook portions 102 ($T>D$), rotation of the bracket 100 is interrupted, an issue arises in that it becomes hard to assemble the bracket 100. That is, the bracket 100 can be assembled only to the panel 105 with a given thickness and, therefore, the bracket 100, forming a mounting objective plate body, cannot be applied to the other structure than that with a single thickness. For, instance, in general, the bracket, in which the auxiliary unit such as the sunvisor is fixedly mounted in a vehicle compartment, is comprised of a panel-side bracket and a visor-side bracket with the visor-side bracket being secured to the trim that forms the interior material of a vehicle panel. Since it is a usual practice for the trims to have different thickness depending on vehicle models or grades of the vehicles, there is a need for the visor-side brackets with trims of different thickness to be prepared in the related art practice.

Further, with the above-described bracket coupling structure, the bracket 100 is free to rotate under a phase where the engagement claw segment 103 is present in the positioning bore 108, an issue arises in that the bracket 100 is subjected to a looseness occurring in the rotational direction. Then, the bracket is easily and reversely rotate after assembly, with a resultant inability for the bracket 100 to be maintained in a mounting complete position.

Therefore, in order to address the issues described above, it is an object of the present invention to provide a bracket coupling structure that is enabled to mount a bracket onto an mounting objective plate body even with a thickness greater than a given value. Further, another object of the present invention is to provide a bracket structure that is enabled to retain a bracket, with no occurrence of reverse rotation after mounting, which can remain in a rotating complete position. Also, it is an object of the present invention to provide a bracket coupling structure with a bracket that remains in a rotating complete position without occurrence of reverse rotation after mounting of the bracket while enabling the bracket to be mounted to a mounting opening of a mounting objective plate body in a centering condition.

According to a principal aspect of the present invention, there is provided a bracket coupling structure that includes hook portions disposed on at least two positions of a base plate of a bracket and having L-shape cross sections directed outward, respectively, with respect to a rotation center of the bracket, wherein under a condition where the hook portions are inserted to a mounting opening of the mounting objective plate body, the bracket is rotated in a mounting rotational direction through which the hook portions engage a peripheral edge of the mounting opening whereby the bracket is fixedly secured to the mounting rotational direction, wherein resilient catch-up blades are disposed on distal ends, facing in the mounting rotational direction, of the hook portions and sloped in directions to be separate away from the base plate toward an upstream of the mounting rotational direction.

Further, in the above-described bracket structure, it may be preferable to further include a reverse-rotation interrupt protrusion disposed on either one of surfaces of the base plate, with which a peripheral edge of the mounting opening of the mounting objective plate body is held in abutting engagement, and the hook portions for providing small rotational resistance during rotation in the mounting rotational direction and large rotational resistance during rotation in a dismounting rotational direction.

Further, in the above-described bracket structure, it may be further preferable for a distance between a rotation center of the bracket and an end face of the mounting opening to be set to gradually decrease from a rotating start position toward a rotating complete position, wherein the bracket coupling structure further comprises a centering rib disposed on either one of surfaces of the base plate, with which a peripheral edge of the mounting opening of the mounting objective plate body is held in abutting engagement, and the hook portions and having a slope with a height that progressively increases from an outer periphery side toward an inner peripheral side.

DETAILED DESCRIPTION OF THE PREFERRED EMBODIMENT

Hereinafter, an embodiment of the present invention is described below with reference to the accompanying drawings.

The presently filed embodiment contemplates to provide a bracket coupling structure of the present invention that is applied to a vehicle-body mounting bracket 1 that allows a sunvisor (auxiliary unit), located on an upper end of a front window for a driver's seat or an assistant driver's seat, to be fixed to a panel that forms a mounting objective plate body.

Figure 1:
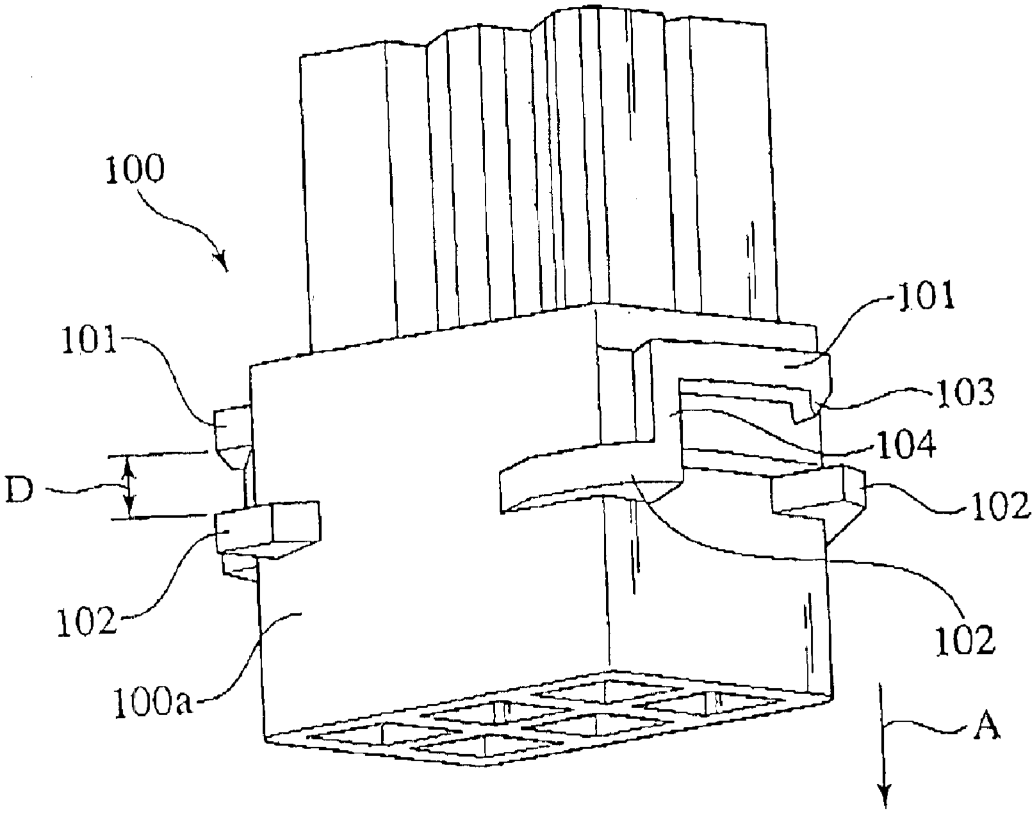
FIG. 1 is a perspective view of a bracket of the related art.
Figure 2:
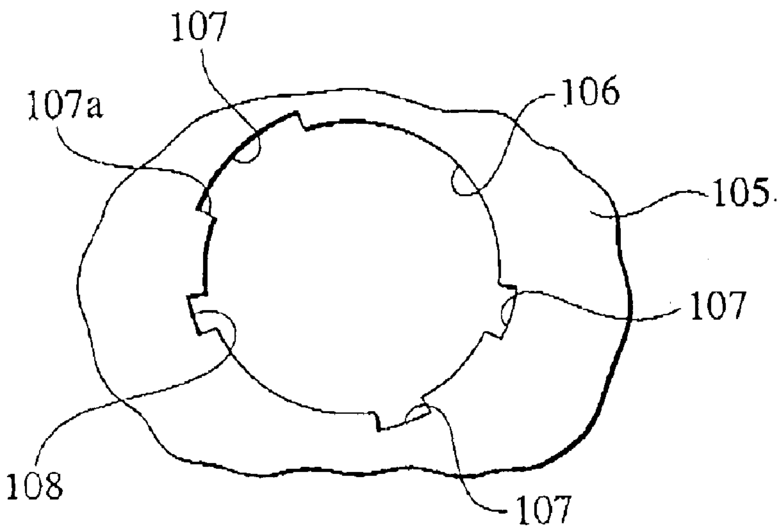
FIG. 2 is a bottom view of a panel of the related art.
Figure 3:
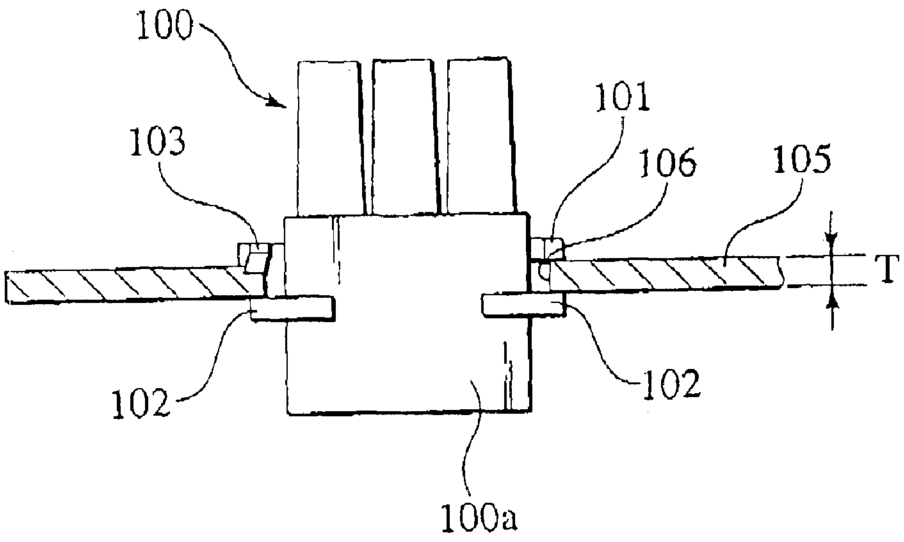
FIG. 3 is a front view illustrating the bracket of the related art in a coupled state.
Figure 4:
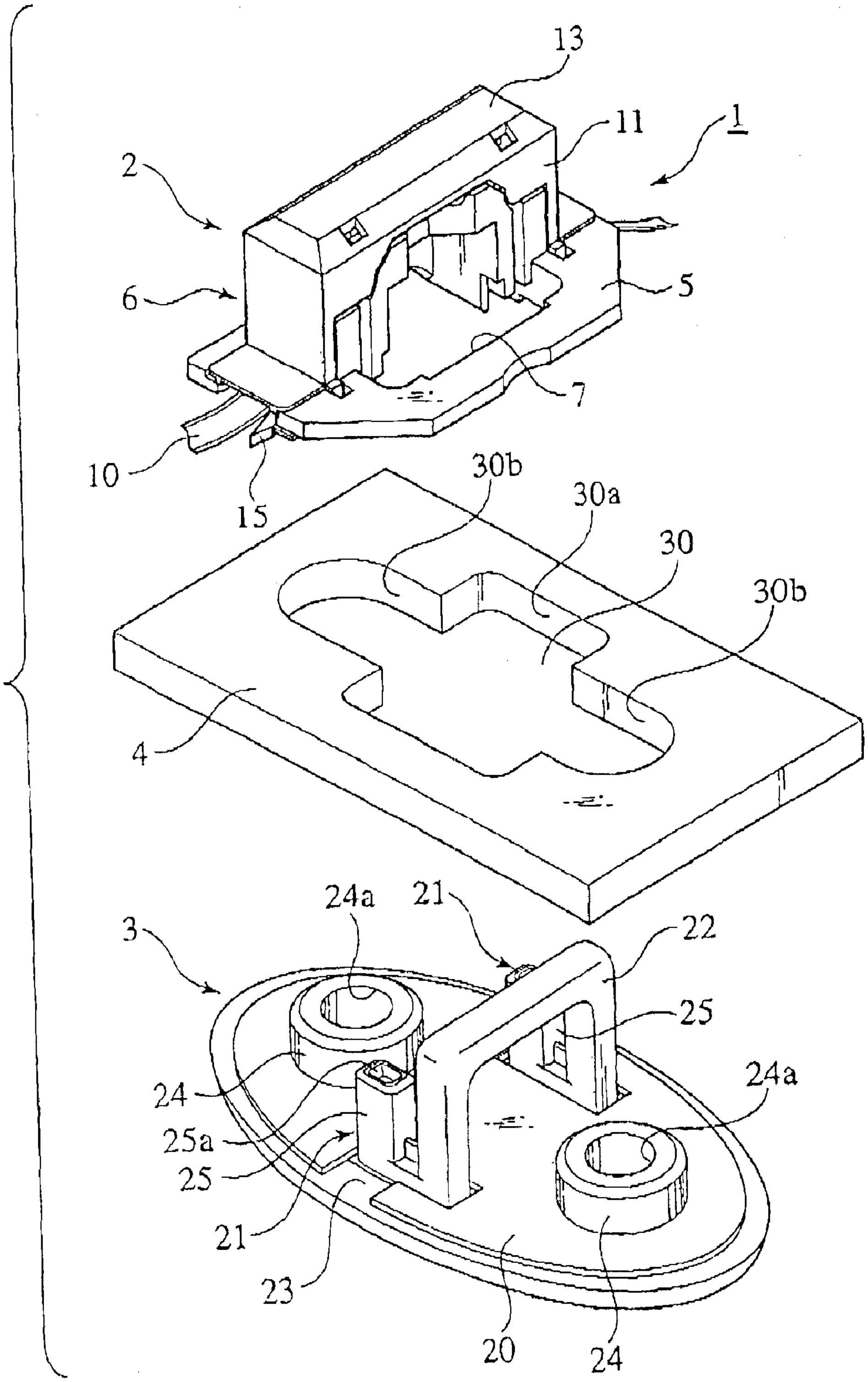
FIG. 4 is an exploded perspective view of a vehicle-body mounting bracket of an embodiment according to the present invention.
Figure 5:
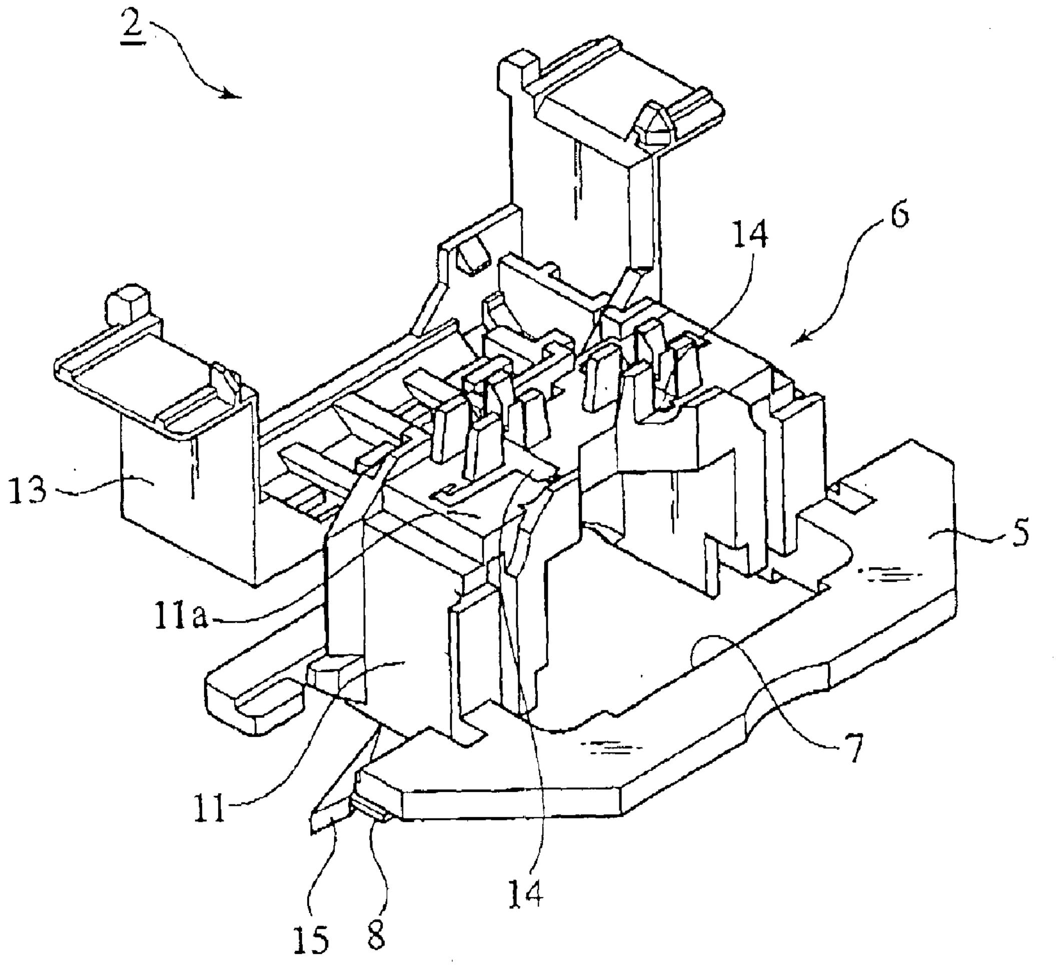
FIG. 5 is a perspective view of a panel-side bracket with a cover assuming a condition prior to being assembled in the embodiment of the present invention.
Figure 6:
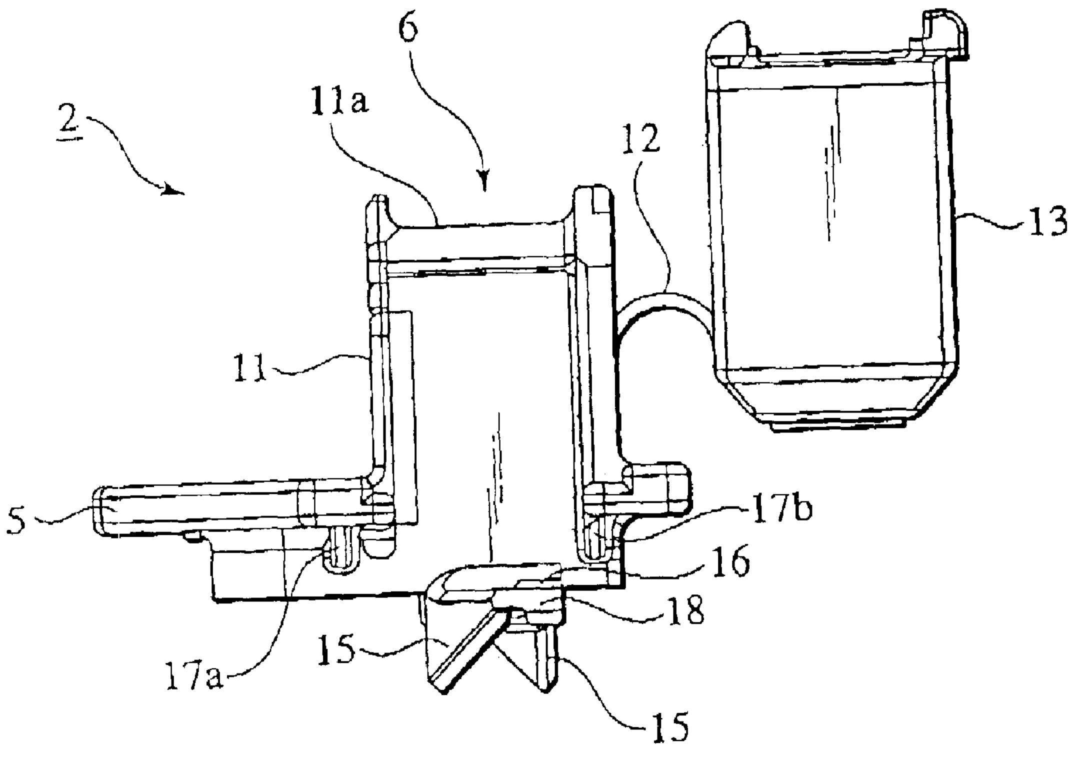
FIG. 6 is a front view of the panel-side bracket with the cover assuming the condition prior to being assembled in the embodiment of the present invention.
Figure 7:
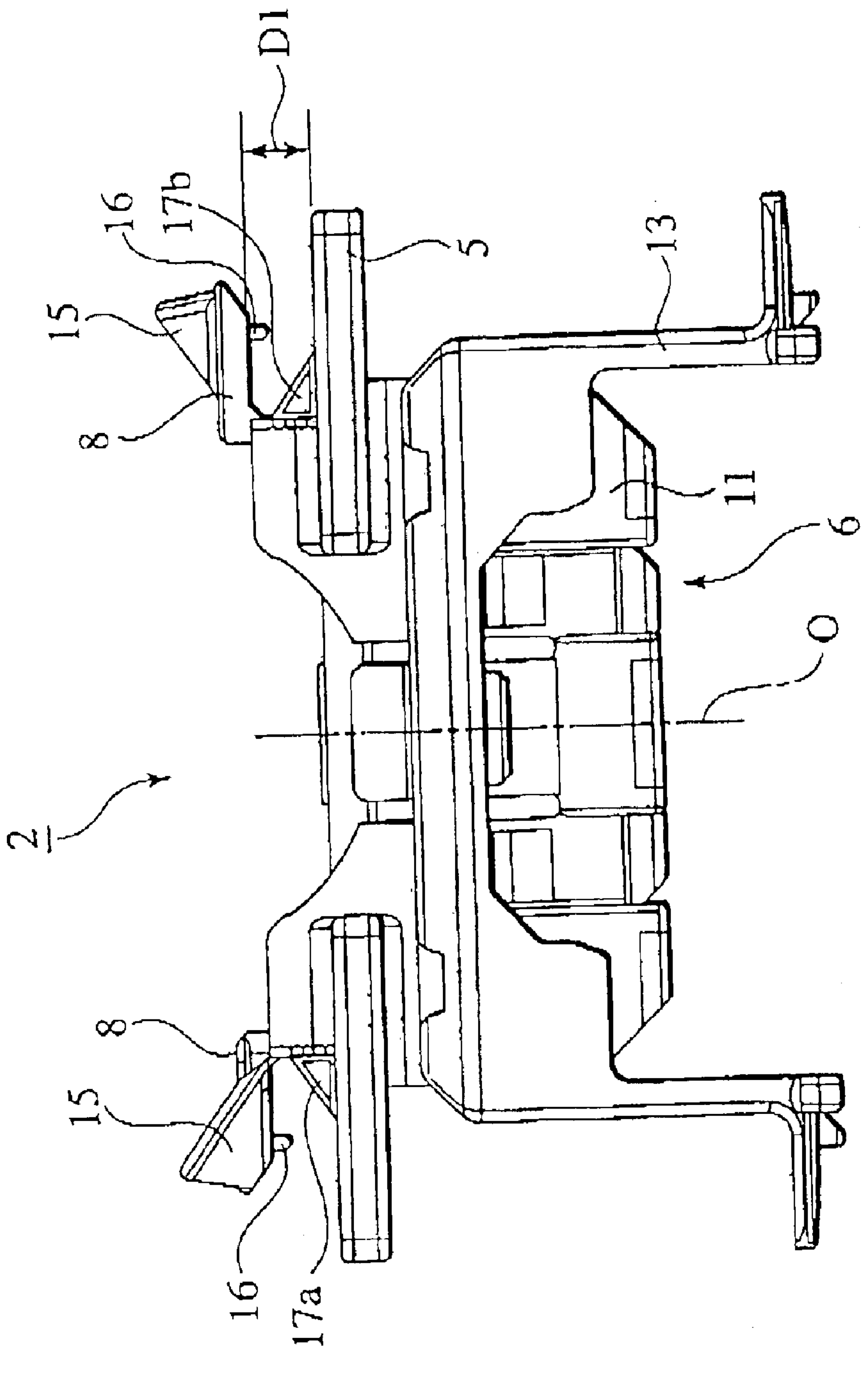
FIG. 7 is a side view of the panel-side bracket, inverted upside down, with the cover assuming the condition prior to being assembled in the embodiment of the present invention.
Figure 8:
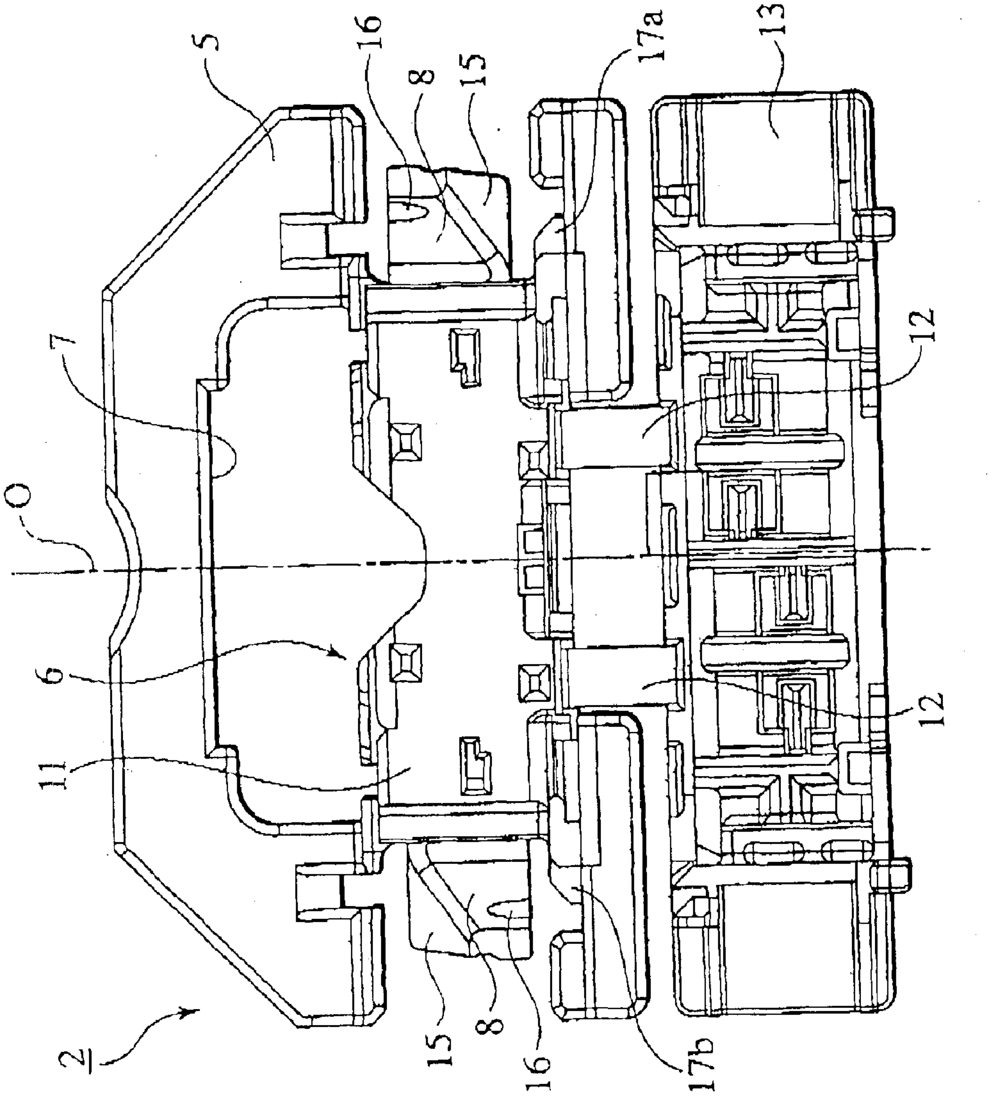
FIG. 8 is a plan view of the panel-side bracket with the cover assuming the condition prior to being assembled in the embodiment of the present invention.

As shown in FIG. 4, the vehicle-body mounting bracket 1 is comprised of a panel-side bracket (bracket) 2 adapted to be fixed to a trim (mounting objective plate body) 4 forming interior material of a panel, and a visor-side bracket 3 united to the panel-side bracket 2 and supporting a sunvisor (not shown).

As shown in FIGS. 5 to 8 in detail, the panel-side bracket 2 is comprised of a thin flat-plate shaped, base plate 5, a panel-side connector section 6 protruding upward from the base plate 5, a positioning engagement section 7 formed so as to extend through a center of the base plate 5, and a pair of book portions 8 with L-shapes in cross section disposed in opposing positions angled at 180 degrees on a bottom of the base plate 5 and orientated outward with respect to a center of a mounting rotation center O.

The panel-side connector section 6 is formed with the base plate 5 in a unitary fashion and includes a female connector housing 11 with its upper and both side walls formed with wire receiving recesses 11*a* for a flat cable 10, a cover 13 connected to the female connector housing 11 by means of a hinge 12 and covering the wire receiving recesses 11*a* of the female connector housing 11 to hold the flat cable 10, and two pieces of bus bar circuit bodies 14 incorporated in the female connector housing 11 through insert formation.

A lower wall of the female connector housing 11 has mating connector insertion ports (not shown) through which visor-side connector sections 21, which will be described later, are inserted. Formed on each of the bus bar circuit bodies 14 are a press knife-edge segment (not shown) that protrudes upward from the upper wall of the wire receiving recess 11*a* and allows a conductor of the flat cable to be press connected, and a male terminal (not shown) located inside the female connector housing 11 and connected to female terminal (not shown) of the visor-side connector section 21 which will be described later.

The pair of hook portions 8 are set such that a deviation dimension D1 in respect of a bottom wall of the base plate 5 is determined to have a value equal to a thickness of the normal trim 4. Formed on distal ends, facing a mounting rotational direction M, of the hook portions 8 in unitary structures, respectively, are rectangular shaped resilient catch-up blade portions 15, with the pair of resilient catch-up blade portions 15 being inclined in directions separate away from the base plate 5 toward an upstream of the mounting rotational direction M, respectively.

Figure 12:
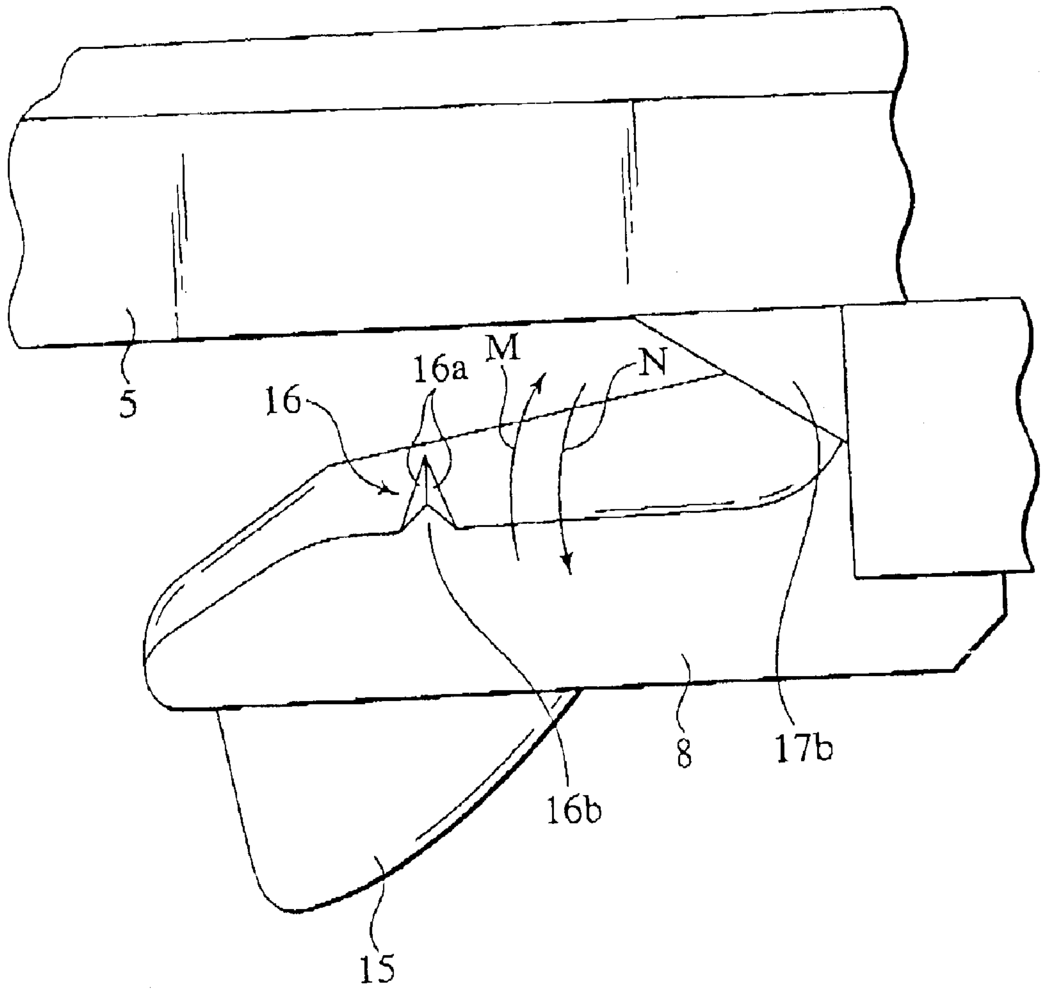
FIG. 12 is a perspective view of an essential part in the vicinity of a reverse rotation interrupt protrusion in the embodiment set forth above.
Figure 13:
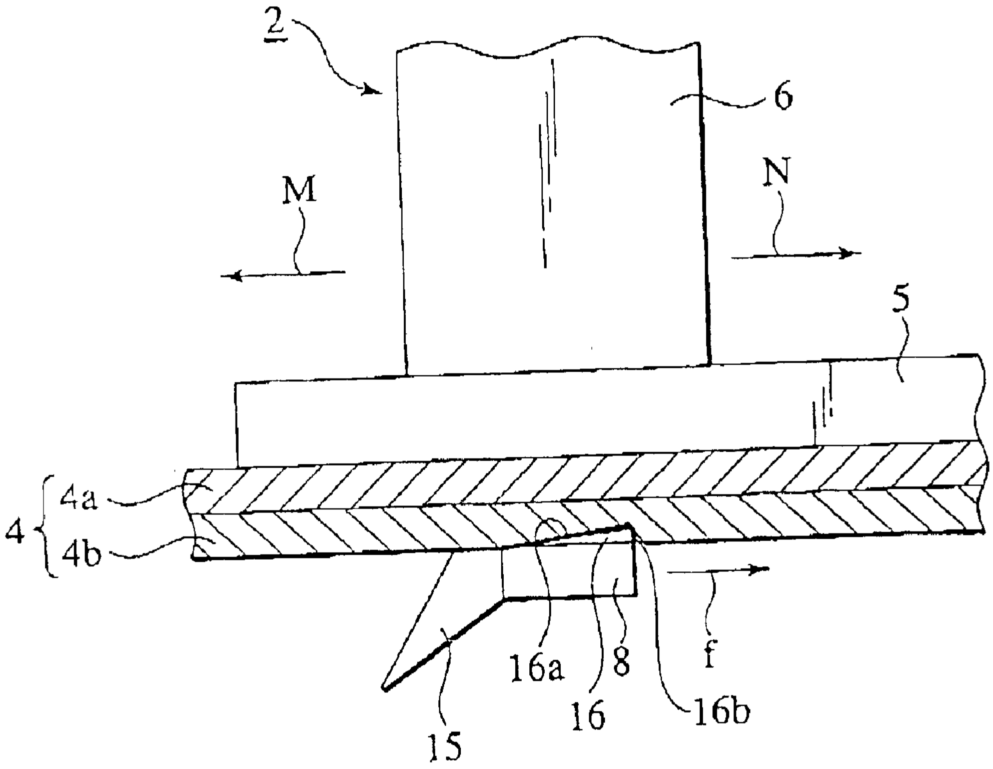
FIG. 13 is a schematic side view illustrating action of the reverse rotation interrupt protrusion in the embodiment set forth above.

Further, disposed on inner walls of the respective hook portions 8 at areas against which a peripheral edge of a mounting opening 30 of the trim 4 abuts are triangular cone-shaped reverse-rotation interrupt protrusions 16 that extend along a rotating circumferential direction of the panel-side bracket 2. As shown in FIGS. 12 and 13 in detail, each of the reverse-rotation interrupt protrusions 16 is formed with a slope including a leading area, orientated in the mounting rotational direction M, shaped in a gradual slope 16*a* (as shown in FIG. 12) and a trailing area, orientated in the mounting rotational direction M, shaped in a sharp slope, that is, a vertical wall 16*b* (as shown in FIG. 12) such that during rotation of the bracket 2 in the mounting rotational direction M, rotational resistance is small and during rotation of the bracket 2 in the dismounting rotational direction N, rotational resistance is large. The reverse-rotation interrupt protrusions 16 are disposed on the two hook portions 8, respectively, which face in opposing positions angled at 180 degrees and assume positions located at circumferentially equidistantly spaced positions (that is, in positions angled at 180 degrees in respect of a rotation center angle) on the rotating circumference.

Furthermore, disposed on a lower surface of the base plate 5 at areas against which the peripheral edge of the mounting opening 30 of the trim 4 abuts are pair of left and right centering ribs 17*a*, 17*b* each of which has a slope gradually increases in height from an outer peripheral side toward an inner peripheral, side. The pair of left and right centering ribs 17*a*, 17*b* are arranged in layout to assume positions slightly rotated far away from and slightly in front of a rotating complete position with the panel-side bracket 2 remaining in the rotating complete position. The reason of such a layout is described below in detail. Since the pair of left and right centering ribs 17*a*, 17*b* are located in the positions substantially opposing to the two hook portions 8 which are placed in opposition at an angle of 180 degrees, the pair of left and right centering ribs 17*a*, 17*b* are located at circumferentially equidistantly spaced positions (that is, angled at 180 degrees in respect of the rotation center angle) on the rotating circumference.

Turning back to FIG. 4, the visor-side bracket 3 has a substantially elliptical shape and is comprised of a thin flat-plate shaped mounting base plate 20, a pair of visor-side connector sections 21 protruding from an upper wall of the mounting base plate 20, a guide bar section 22 formed in a C-shaped configuration, a pair of hook receiving indent portions 23 formed on an upper wall of the mounting base plate 20 at further outer areas of the visor-side connector sections 21, and screw fixture sections 24 disposed at two positions of the mounting base plate 20.

The visor-side connector section 21 is constructed of male connector housings 25 fixed to the mounting base plate 20, and female terminals (not shown) accommodated in the mare connector housing 25, respectively. The male connector housings 25 have upper walls formed with mating terminal insertion bores 25*a*, respectively, through which male terminals (not shown) are inserted.

Connected to the female terminals (not shown) are terminal ends of electric wires (not shown) extending from the sunvisor. Although each hook receiving indent portion 23 has an area with a width to permit the hook portion 8 and the resilient catch-up blade 15 to be accommodated, a depth of the hook receiving indent portion 23 is determined to be of an extent to allow the hook portion to be accommodated. Each screw fixture segment 24 is internally formed with a screw insertion bore 24*a* through which a screw (not shown) extends and passes through the mounting opening 30 of the trim 4 to be screwed into an associated screw bore (not shown) of a panel (not shown).

Figure 10:
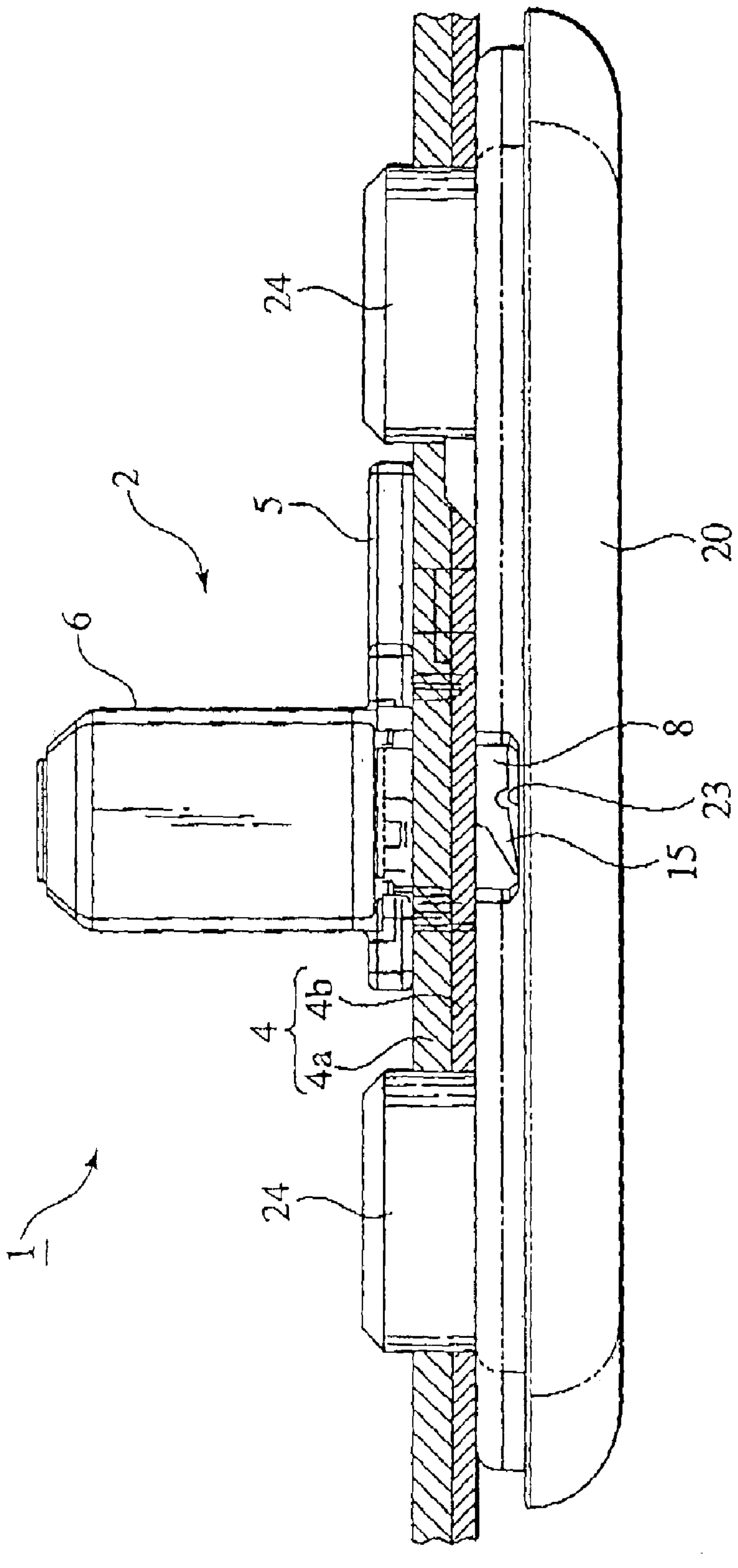
FIG. 10 is a cross sectional view illustrating a situation with the panel-side bracket in the embodiment set forth above being mounted to a panel.

The trim 4 forms interior material that is fixedly secured to an internal wall of a panel (not shown) of a vehicle body and is made of material available to be resiliently deformed in a thickness direction. As shown in FIGS. 10 and 13, the trim 4 takes the form of a double-layer structure composed of a base plate 4*a* and a facing 4*b*, with the facing 4*b* being placed so as to face an inside of the vehicle body. Also, in FIGS. 11A, 11B and FIGS. 14 to FIGS. 18A, 18B, the double-layer structure of the trim 4 is omitted for the sake of clarification.

Formed in the trim 4 is the mounting opening 30 that is configured in a substantially cruciform shape composed of a bracket mounting opening 30*a* and a pair of circular arc shaped screw openings 30*a* formed in communication with opposing both sides of the bracket mounting opening 30*a*. With the presence of the bracket mounting opening 30*a* being formed in such a rectangular configuration, as shown in FIGS. 16A, 16B to FIG. 19, a distance between the rotation center O of the panel-side bracket 2 and an end face of the bracket mounting opening 30*a* is so determined to be progressively shortened as the panel-side bracket 2 rotates from a rotating start position toward a rotating complete position. And, the mounting opening 30 is formed such that the distance between the rotation center O of the panel-side bracket 2 and the end face of the bracket mounting opening 30*a* remains in the shortest distance at the rotating complete position.

Also, formed in a panel (not shown) at a position opposing to the bracket mounting opening 30*a* of the trim 4 is an opening (not shown) to which the panel-side connector section 6 is inserted, and formed in the panel (not shown) at areas opposing to the pair of screw openings 30*b* of the trim 4 are a pair of screw bores (not shown). And, wired over a space on an upper side of the panel (not shown) is a flat cable 10 that has been described above.

Figure 9:
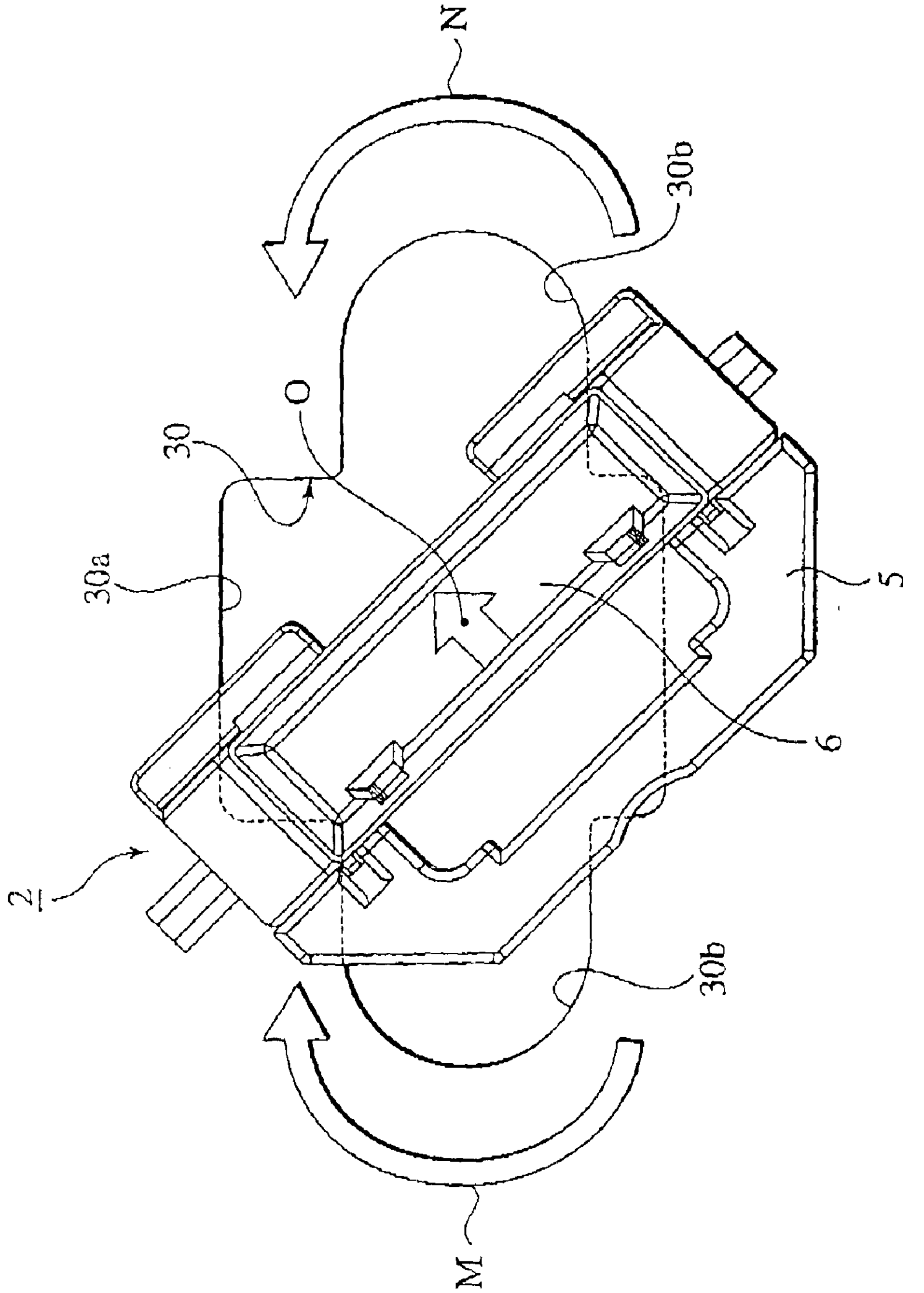
FIG. 9 is a plan view illustrating a process for mounting a trim to the panel-side bracket in the embodiment set forth above.

Next, a sequence of mounting the vehicle-body mounting bracket 1 is described. First, the panel-side bracket 2 is placed on the upper wall (at a side closer to a vehicle outside) of the trim 4, and the pair of hook portions 8 of the panel-side bracket 2 are inserted through the bracket mounting opening 30*a* of the mounting opening 30 of the trim 4. As shown in FIG. 9, the panel-side bracket 2 is inserted to the bracket mounting opening 30*a* along a diagonal line position of a rectangular configuration of the bracket mounting opening 30*a*, that is, along a direction in which the distance from the center takes the maximum value.

Next, as shown in FIG. 9, the panel-side bracket 2 inserted to the mounting opening 30 of the trim 4 is rotated in the mounting rotational direction (clockwise in FIG. 9) M. Then, since the pair of hook portions 8 rotationally translates to a position to allow the distance from the center of the bracket mounting opening 30*a* to progressively decrease, the pair of hook portions 8 gradually intrude the peripheral edge of the mounting opening 30 of the trim 4. With the pair of hook portions 8 intruding the peripheral edge of the mounting opening 30, the hook portions 8 rotate while in sliding contact with the lower surface of the trim 4 and completes rotation at a time when the hook portions 8 rotate to positions where a line segment interconnecting the pair of hook portions 8 intersects the end face of the bracket mounting opening 30*a*. At the rotating complete position, a situation takes place where the peripheral edge of the mounting opening 30 of the trim 4 is sandwiched between the base plate 5 of the panel-side bracket 2 and the pair of hook portions 8, thereby causing the panel-side bracket 2 to be fixedly secured to the trim 4 (see FIG. 15).

After the panel-side bracket 2 has been mounted onto the upper wall of the trim 4, the flat cable 10 is pulled out from the opening (not shown) of the panel (not shown), and the flat cable 10, thus pulled out, is connected to a crimp-style terminal (not shown) of the panel-side connector section 6 by press fitting, whereupon the cover 13 is placed over the female connector housing 11 to complete the panel-side connector 6. Also, this work may be carried out prior to mounting the panel-side bracket 2 onto the trim 4.

Subsequently, the trim 4 to which the panel-side bracket 2 is mounted is mounted to the panel (not shown). During such mounting, the panel-side connector section 6 of the panel-side bracket 2 is located inside the opening of the panel (not shown).

Next, the visor-side bracket 3 is moved closer to the panel-side bracket 2 at a lower side thereof. Then, the guide bar section 22 of the visor-side bracket 3 is inserted to the positioning engagement section 7 such that the visor-side bracket 3 is progressively united with the guide bar section 22 being guided by the positioning engagement section 7. Because of a guide function of the guide bar section 22, the visor-side bracket 3 is guided to an appropriate coupling position with respect to the panel-side bracket 2, and the visor-side connector section 21 of the visor-side bracket 3 is coupled to the panel-side connector section 6 of the panel-side bracket 2 under an appropriate condition.

Upon complete coupling between the panel-side connector section 6 and the visor-side connector section 21, the panel-side bracket 2 and the visor-side connector section 21 are temporarily locked through a temporary lock means. Also, as the panel-side connector section 6 and the visor-side connector section 21 are completely engaged, the internal female terminal (not shown) and the male terminal (not shown) are electrically connected, thereby providing electrical conduction between the flat cable 10 and the electric wire (not shown) of the sunvisor side. In addition, as the visor-side bracket 3 is completely assembled to the panel-side bracket 2, as shown in FIG. 10, the pair of hook portions 8 of the panel-side bracket 2 and the resilient catch-up blades 15 are accommodated in the hook receiving indent portions 23. Here, since the depth dimension of the hook receiving indent portion 23 merely extends in an extent to accommodate the hook portion 8, the pair of resilient catch-up blades 15 are pressed onto the trim 4 and, under resiliently deformed condition caused by such a resulting pressing force, are received in the pair of hook receiving indent portions 23 of the visor-side bracket 3.

Next, the screws (not shown) are inserted from a downward area to the pair of screw fixture segments 24 of the visor-side bracket 3 and are screwed into the associated screw bores (not shown) of the panel (not shown), respectively, completing the mounting work for the sunvisor (not shown).

Also, when dismounting the vehicle-body mount bracket 1 for some reasons, the screws (not shown) are removed and then, the visor-side bracket 3 is pulled from the panel-side bracket 2. Next, the panel-side bracket 2 can be dismounted by rotating it in the dismounting rotational direction (counter-clockwise in FIG. 9) N with respect to the trim 4 to allow the panel-side bracket 2 to be removed from the mounting opening 30 of the trim 4.

Figure 11A:
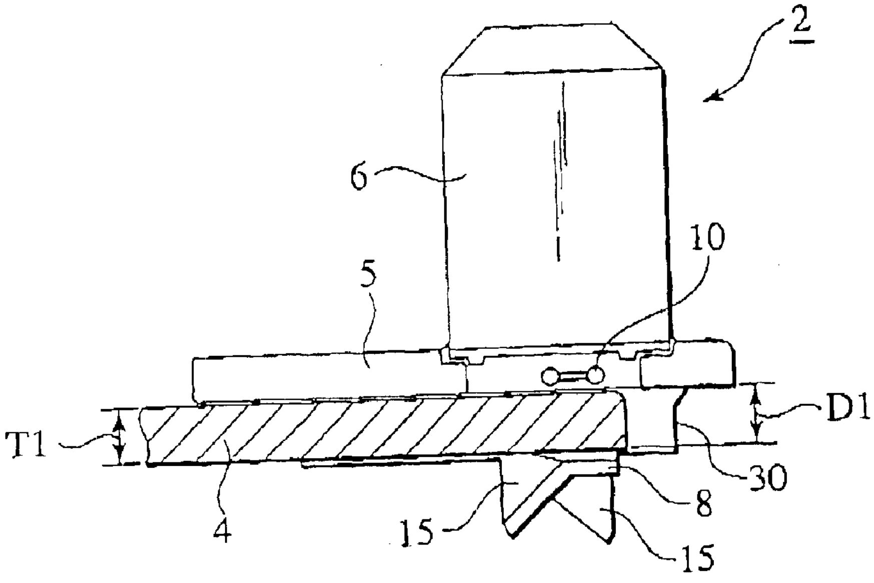
FIG. 11A is a side view illustrating a condition in which the panel-side bracket is mounted to the trim with a thin thickness in the embodiment set forth above.

During the above-described mounting work or during mounting rotational operation of the panel-side bracket 2 with respect to the trim 4, if a thickness of the trim 4 is T1 that is substantially equal to the deviation dimension D1 between the base plate 5 of the panel-side bracket 2 and the hook portion 8 as shown in FIG. 11A, as the panel-side bracket 2 is rotated, the pair of hook portions 8 are held in sliding engagement with the surface of the trim 4 to cause the pair of hook portions 8 to engage the peripheral edge of the mounting opening 30 of the trim 4.

Figure 11B:
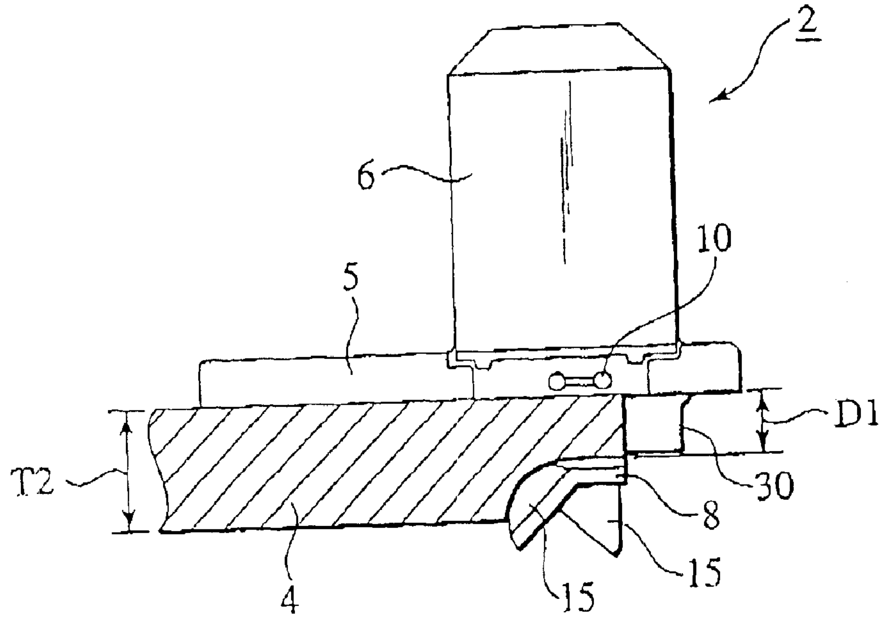
FIG. 11B is a side view illustrating a condition in which the panel-side bracket is mounted to the trim with a thick thickness in the embodiment set forth above.

Further, as shown in FIG. 11B, if the thickness of the trim is T2 which is greater than the deviation dimension D1 between the base plate 5 of the panel-side bracket 2 and the book portion 8, as the panel-side bracket 2 is rotated, the pair of resilient catch-up blades 15 causes the trim 4 to be pressed in a compressed direction for compression and deformation such that the pair of hook portions 8 slides on the surface of the trim 4 with the pair of resilient catch-up blades 15 compressing and deforming the trim 4 whereby the pair of hook portions 8 engage the peripheral edge of the mounting opening 30 of the trim 4. Accordingly, even if the trim 4 has a thickness greater than a given value, the panel-side bracket 2 is fixed in place.

During the above-described mounting work and in a process where the panel-side bracket 2 is rotationally mounted to the trim 4, as shown in FIG. 13, rotation of the panel-side bracket 2 is permitted while suffering from small rotational resistances from the slopes 16*a* of the reverse-rotation interrupt protrusions 16, and the panel-side bracket 2 can be rotated to the rotating complete position. And, as shown in FIG. 13, if the external force f in the reverse rotational direction subsequent to the panel-side bracket 2 being mounted, since the panel-side bracket 2 is encountered with large rotational resistance from the vertical wall 16*b* of the reverse-rotation interrupt protrusions 16 and reverse rotation is avoided, the panel-side bracket 2 is not caused to reversely rotate after the mounting and is able to retain at the rotating complete position.

In the presently filed embodiment set forth above, although the reverse-rotation interrupt protrusions 16 have been described with reference to an exemplary case in that the rear distal end in respect of the mounting rotational direction M is formed of the vertical wall (rapid slope) 16*b* and the leading surface in respect of the mounting rotational direction M includes the gradual slope 16*a*, it suffices for the structure to be configured that rotational resistance is minimized during rotation in the mounting rotational direction M and rotational resistance is increased during rotation in the dismounting rotational direction N.

In the presently filed embodiment set forth above, although the reverse-rotation interrupt protrusions 16 have been described with reference to an exemplary structure as being formed on the hook portions 8, it may be disposed on the base plate 5. However, with the mounting objective plate body being formed of the trim 4 like the presently filed embodiment, there are many probabilities where the panel-side bracket 2 is made of material that is easy to intrude as compared to the base plate 4*a*, and as the panel-side bracket 2 encounters the external force f in the dismounting rotational direction N, the reverse-rotation interrupt protrusions 16 easily intrude the facing 4*b*, with a resultant capability for reliably preventing reverse rotation.

By the way, in a case where the trim 4 has a thin thickness, the panel-side bracket 2 is liable to be reversely rotated. But, there are many probabilities where in case of the thin trim 4, the facing is made of unwoven fabric (felt cloth) and, so, the reverse-rotation interrupt protrusions 16 are liable to easily engage the unwoven fabric. Also, in a case where the trim 4 has a thick thickness (as appeared in a high class vehicle), there are many probabilities where the facing 4*b* is made of knit (woven fabric) to cause the reverse-rotation interrupt protrusions 16 to slip. However, since the trim 4 is subjected to a large compression force between the hook portion 8 and the base plate 5, the reverse-rotation interrupt protrusions 16 attribute to adequately engage the knit and, in any case, reverse rotation is reliably prevented.

Further, although the reverse-rotation interrupt protrusions 16 undergo a few degree of travel resistance during travel in a radial direction of the panel-side bracket 2 and, in case of the thin trim 4, since only a small compression force is encountered between the hook portion 8 and the base plate 5, no centering action, which will be described later, is hindered. In case of the thick trim 4, although a large compression force is encountered between the hook portion 8 and the base plate 5, since the facing 4*b* is easy to slip, no centering action, which will be described later, is hindered.

In addition, even in an event that the thin trim 4 is formed to be thinner than a designed value, an advantage is that the reverse-rotation interrupt protrusions 16 are able to preclude a looseness resulting from a difference in height.

With the presently filed embodiment described above, the reverse-rotation interrupt protrusions 16 are disposed at the circumferentially equidistantly spaced positions (at the angle of 180 degrees in terms of the rotation center angle) on the rotating circumferential. For this reason, during mounting rotational operation of the panel-side bracket 2, the presence of the reverse-rotation interrupt protrusions 16 allows only small rotational resistance to act with no bias in the rotational direction and no interference takes place against the mounting rotational operation of the panel-side bracket 2. Also, when the external force f in the reverse rotational direction acts after the panel-side bracket 2 has been assembled, since the reverse-rotation interrupt protrusions 16 provide large rotational resistances with no bias in the rotational direction, the reverse rotation can be reliably avoided. Also, in the presently filed embodiment set forth above, the hook portions 8 and the reverse-rotation interrupt protrusions 16 have been described as disposed in the two opposing positions, respectively, at 180 degrees in the rotational direction, of course, it is to be noted that these components may be located at three circumferentially equidistantly spaced positions.

During the mounting work set forth above and when rotationally mounting the panel-side bracket 2 onto the trim 4, if the panel-side bracket 2 is rotated from the rotating start position toward the rotating complete position, the peripheral edge of the bracket mounting opening 30*a* progressively intrudes the centering ribs 17*a*, 17*b* and the panel-side bracket 2 is retained under a condition where the peripheral edge of the bracket mounting opening 30*a* intrudes the pair of centering ribs 17*a*, 17*b*, located at two positions at the rotating complete position. As a consequence, if the external force f acts in the reverse rotational direction after the panel-side bracket 2 has been assembled, due to intrusion of the peripheral edge of the bracket mounting opening 30*a*, since the panel-side bracket 2 encounters large rotational resistances to avoid reverse rotation, no reverse rotation takes place in the panel-side bracket 2 after mounting thereof whereby the rotating complete position can be maintained. That is, in the presently filed embodiment, the panel-side bracket 2 is influenced with both functions of the reverse-rotation interrupt protrusions 16 and the centering ribs 17*a*, 17*b* and is reliably retained at the rotating complete position.

Further, even if the thin trim 4 is formed in a further thin configuration that the designed value, an advantage is that since the peripheral edge of the trim 4 intrudes the centering ribs 17*a*, 17*b*, the trim 4 is prevented from being rickety.

Figure 14:
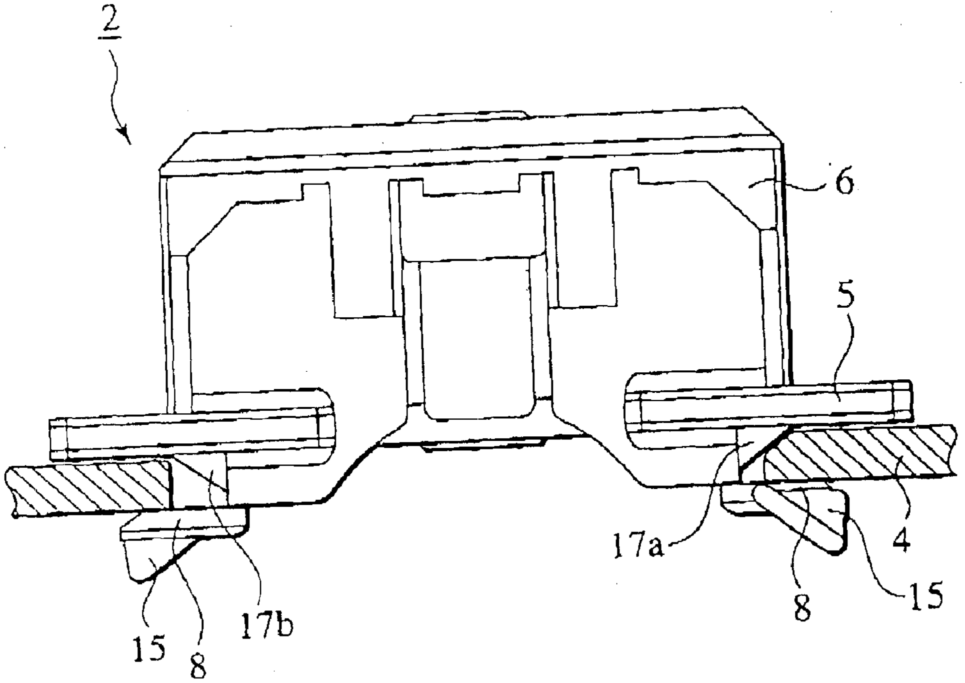
FIG. 14 is a front view illustrating a centering action of a centering rib in a midcourse of rotation of the panel-side bracket of the embodiment set forth above.
Figure 15:
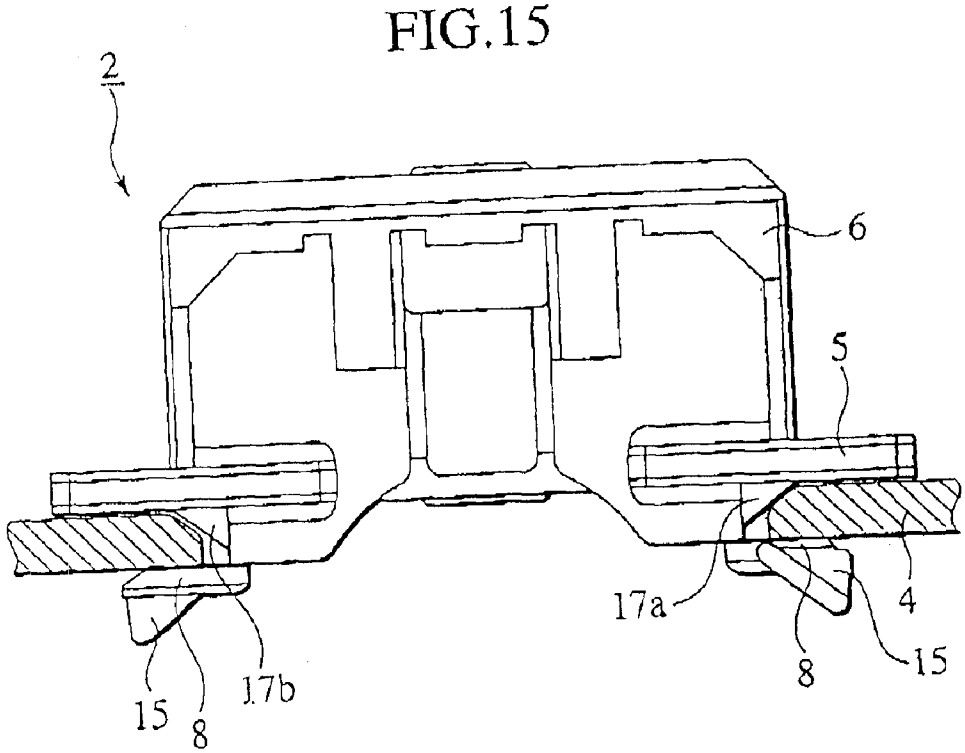
FIG. 15 is a front view illustrating a situation the panel-side bracket remains in a rotating complete position and is centered by the centering rib in the embodiment set forth above.

In addition, during a rotating stage in which the panel-side bracket 2 travels from the rotating start position to the rotating complete position, as shown in FIG. 14, if the panel-side bracket 2 shifts in the radial direction front the rotation center O, a difference takes place in the degree of intrusion of the peripheral edge of the bracket mounting opening 30*a* with respect to the centering ribs 17*a*, 17*b* (rightward in FIG. 14) at a shifted side and the centering ribs 17*a*, 17*b* (leftward in FIG. 14) at a counter-shifted side and a resulting difference causes the panel-side bracket 2 to be pushed and returned to the rotation center O, the panel-side bracket 2 can be mounted at the center of the bracket mounting opening 30*a* under the centered condition.

Figure 17A:
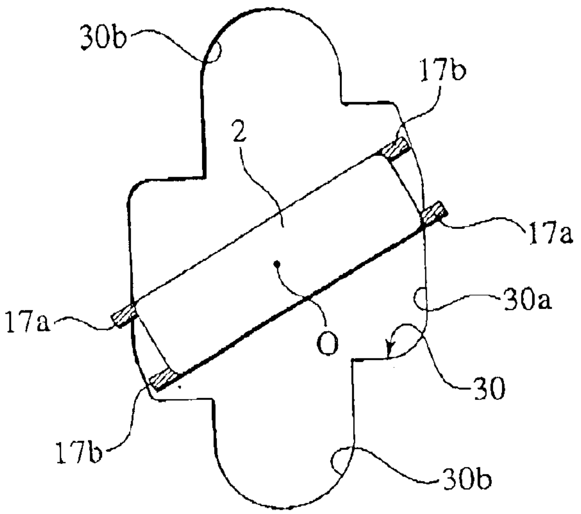
FIG. 17A is a conceptual view of the panel-side bracket assuming a position just short of completing rotation in the embodiment set forth above.
Figure 17B:
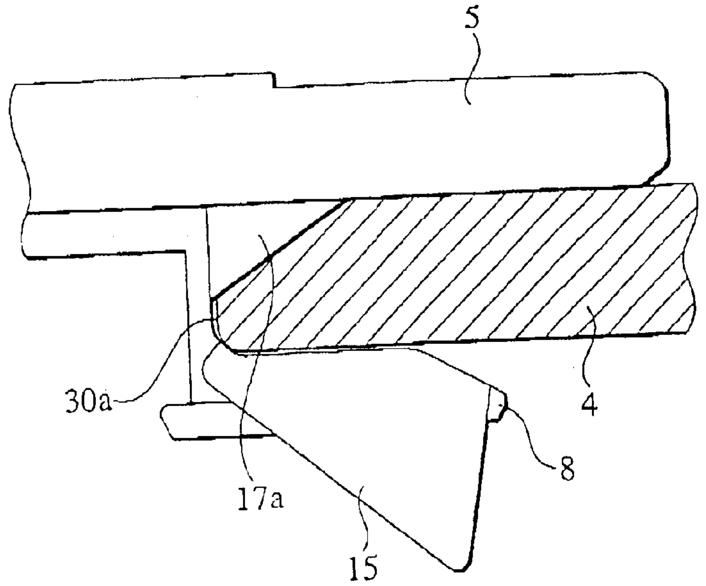
FIG. 17B is a cross sectional view of an essential part illustrating a positional relationship between the centering rib in the position just short of completing rotation and the peripheral edge of the mounting opening.
Figure 18A:
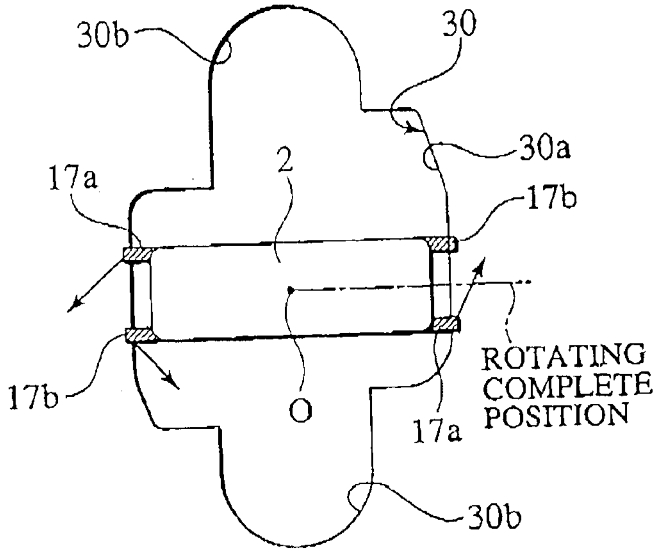
FIG. 18A is a conceptual view of the panel-side bracket assuming the rotating complete position in the embodiment set forth above.
Figure 18B:
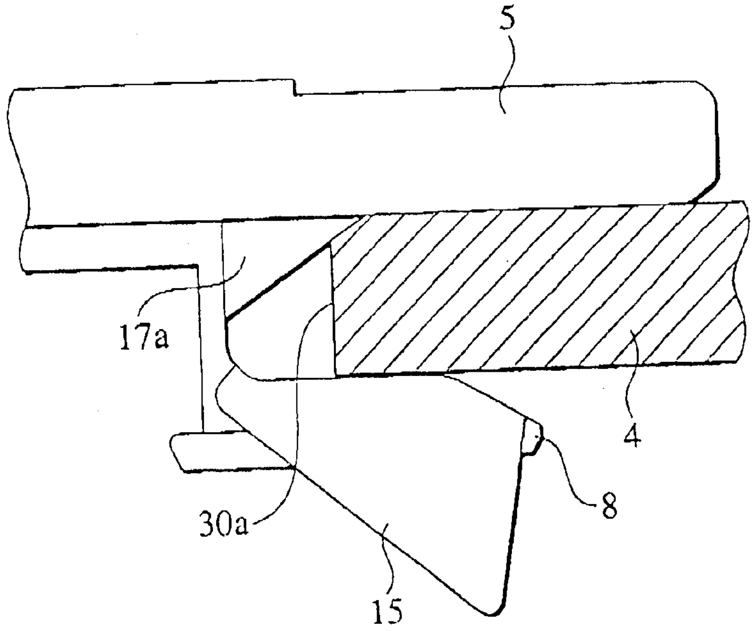
FIG. 18B is a cross sectional view of an essential part illustrating a positional relationship between the centering rib in rotating complete position and the peripheral edge of the mounting opening.
Figure 19:
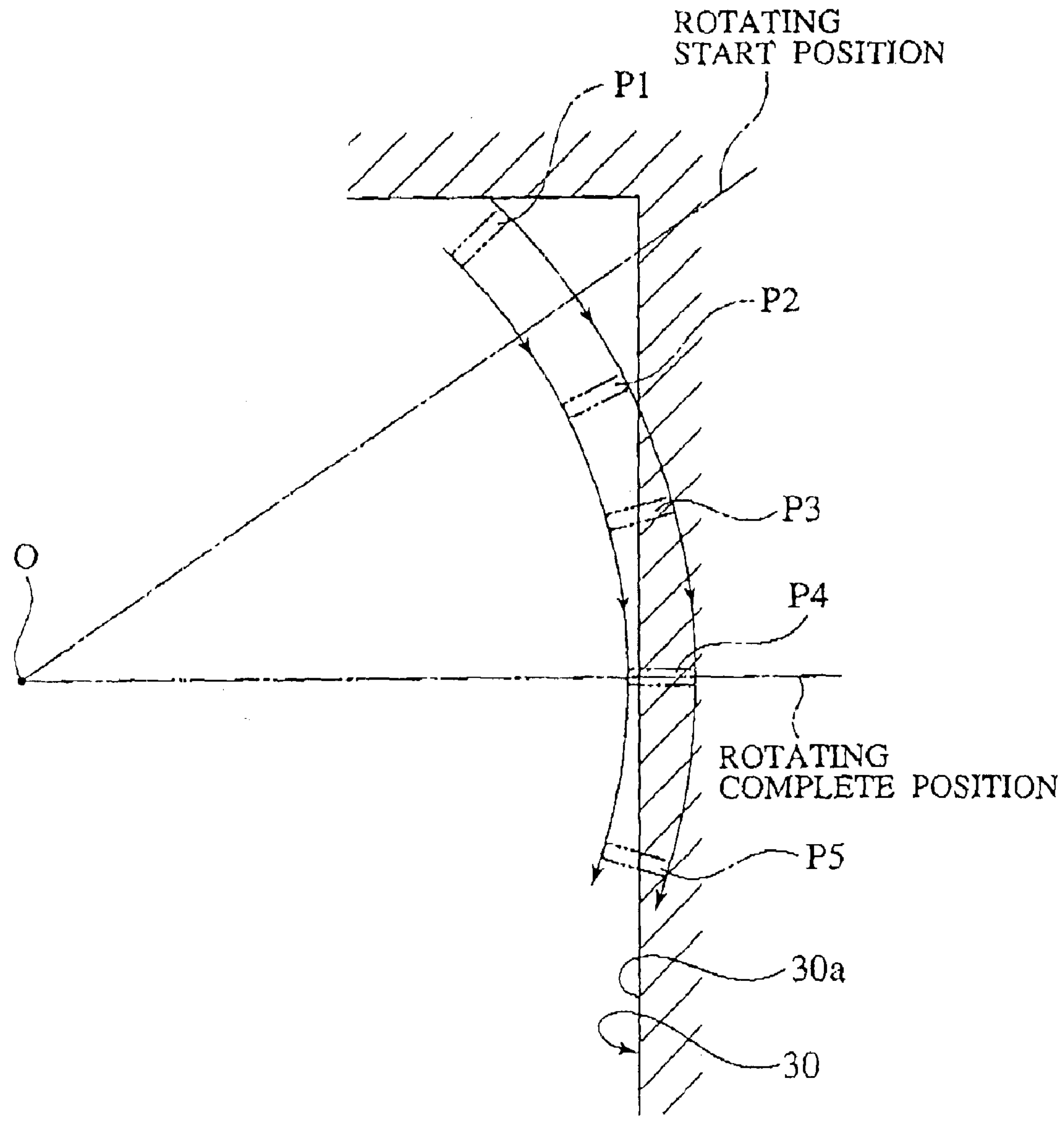
FIG. 19 is a view illustrating an intruding status of the peripheral edge of the mounting opening relative to the centering rib in the embodiment set-forth above.

With the presently filed embodiment previously described above, the bracket mounting opening 30*a* is formed such that the distance between the rotation center O of the panel-side bracket 2 and the end face of the bracket mounting opening 30*a* takes the minimum distance at the rotating complete position. And, since the pair of centering ribs 17*a*, 17*b* are arranged such that at the rotating complete position of the panel-side bracket 2, the pair of centering ribs 17*a*, 17*b* assume the position slightly rotated ahead of the rotating complete position and the position slightly in front thereof. Thus, as shown in FIG. 17A, the centering ribs 17*a*, prevailing in a preceding rotational side, among the pair of centering ribs 17*a*, 17*b*, undergo the maximum rotational resistances at the position in front of the phase where the panel-side bracket 2 reaches the rotating complete position and, as shown in FIGS. 18A, 18B, the centering ribs 17*a* encounter smaller rotational resistances than the maximum values at the rotating complete position of the panel-side bracket 2. Therefore, it is possible for rotational operation of the panel-side bracket 2 to be carried out with a sense of snapping action. Also, due to the presence of the maximum rotational resistance acting on the panel-side bracket 2 at the area in front of the rotating complete position, an advantage results in precluding the panel-side bracket 2 from being reversely rotated.

Figure 16A:
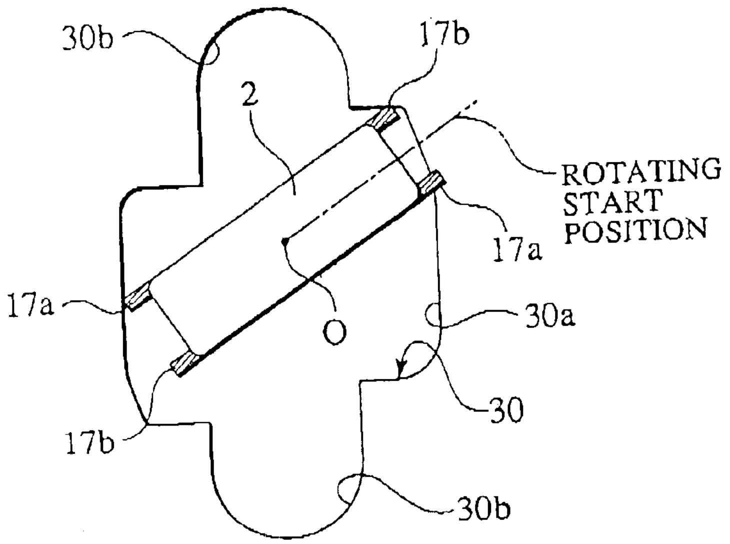
FIG. 16A is a conceptual view of the panel-side bracket assuming a rotating start position in the embodiment set forth above.
Figure 16B:
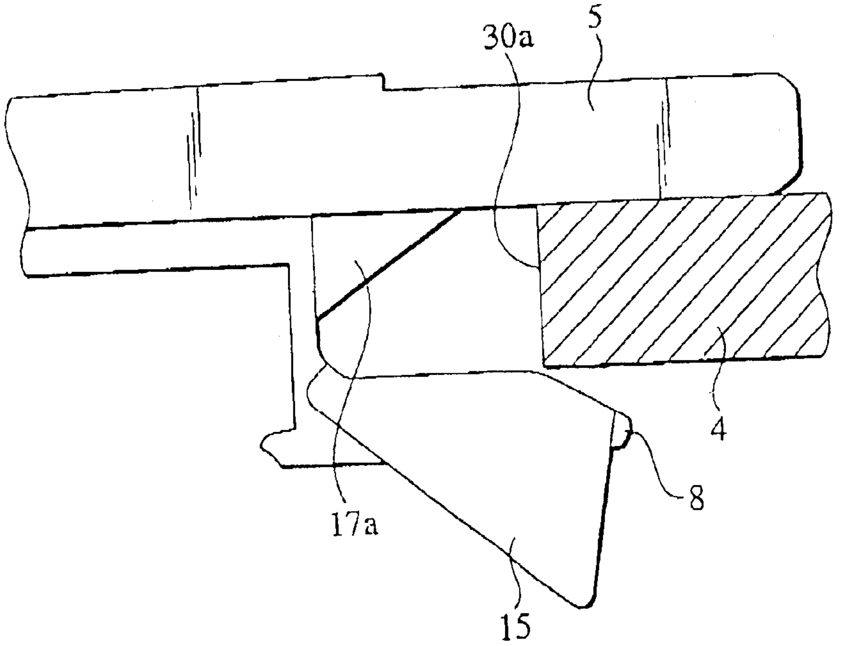
FIG. 16B is a cross sectional view of an essential part illustrating a positional relationship between the centering rib in the rotating start position and a peripheral edge of the mounting opening.

Rotational resistances which the pair of centering ribs 17*a*, 17*b* of the panel-side bracket 2 encounter from the peripheral edge portion of the trim 4, are described further in detail. As shown in FIGS. 16A, 16B, at the rotating start position of the panel-side bracket 2, no interference occurs between the pair of centering ribs 17*a*, 17*b* and the peripheral edge of the trim 4. The centering ribs 17*a*, prevailing in the rotational preceding position, among the pair of centering ribs 17*a*, 17*b*, assume positions on a point P2 in FIG. 19 and the centering ribs 17*b*, prevailing in the rotational trailing position, assumes positions on a point P1 in FIG. 16.

As rotation of the panel-side bracket 2 progresses, as shown in FIGS. 18A, 18B, the peripheral edge of the trim 4 progressively intrudes the centering ribs 17*a* remaining in the rotational preceding position. And, when the centering ribs 17*a* remaining in the rotational preceding position reach the rotating complete position (at a point P4 in FIG. 19), the trim 4 intrudes by the maximum value and the panel-side bracket 2 encounters the maximum resistance from the trim 4. This is because of the fact that, at the rotating complete position, the distance between the rotation center O and the end face of the bracket mounting opening 30*a* is set to remain in the minimum distance. When the centering ribs 17*a*, remaining in the rotational preceding position, slightly rotate ahead from the rotating complete position, as shown in FIG. 18A, the panel-side bracket 2 per se assumes the rotating complete position and the centering ribs 17*a*, remaining in the rotational preceding position, reach the rotational position (at a point P5 in FIG. 19) that is slightly far from the rotating complete position, with a resultant decrease in the degree of intrusion of the peripheral edge of the trim 4.

In the meantime, the centering ribs 17*b* remaining in the trailing rotational position reach a position (at a point P3 in FIG. 19) slightly in front of the rotating complete position with the peripheral edge of the trim 4 remaining in the intruded condition, resulting in a capability of providing a sense of snapping action.

Also, if no sense of snapping action is required when in mounting rotational operation of the panel-side bracket 2, it may be suffice for a single piece of centering rib to be disposed at plurality of locations, respectively.

In the presently filed embodiment, although the centering ribs 17*a*, 17*b* are provided on the surface of the base plate 5, these components may also be located on the surfaces of the hook portions 8.

With the presently filed embodiment, since the centering ribs 17*a*, 17*b* are disposed at the equidistantly spaced positions (spaced at the angle of 180 degrees in terms of the rotation center angle) along the rotating circumference, centering forces are encountered in the rotational direction with no bias from the pair of centering ribs 17*a*, 17*b* disposed at two positions during mounting rotational operation of the panel-side bracket 2, with a resultant centering capability with high precision. Also, in the presently filed embodiment, although the hook portions 8 and the centering ribs 17*a*, 17*b* are located at two points in the opposing positions angled at 180 degrees in the rotational direction, it is, of course, to be noted that these components may be located in equidistantly spaced areas at more than three positions.

Further, the presently filed embodiment has advantages listed below.

With the presently filed embodiment, due to an ability of the visor-side bracket 3, mounted to the panel (not shown), that allows the resilient catch-up blades 15 of the panel-side bracket 2 to be pressed toward the trim to be resiliently deformed, the hook portions 8 and the resilient catch-up blades 15 can be accommodated in the respective hook receiving indent portions 23 of the visor-side bracket 3 with a height of an extent in which only the pair of hook portions 8 are received. For this reason, the panel-side bracket 2 can be fixedly secured with no need for forming the visor-side bracket 3 in a large size. Also, under the mounted condition of the visor-side bracket 3, since the resilient catch-up blades 15 presses the visor-side bracket 3 at all times with a reaction force caused by resilient return movement, there is a screw-loosening blocking effect that precludes screws (not shown), which connects the visor-side bracket 3 to the panel (not shown) from being loosened and even in the occurrence of the screws being loosened, advantages result in a rickety movement blocking effect and in an abnormal sound blocking effect. Additionally, during operation word for mounting the panel-side bracket 2 onto the trim 4, due to the presence of the pair of resilient catch-up blades 15 remaining in a phase prior to resilient deformation, no increase occurs in the mounting force.

With the presently filed embodiment, since the hook portions 8 and the resilient catch-up blades 15 are disposed at the positions spaced at the angle of 180 degrees along the rotating circumference, during mounting rotational operation of the panel-side bracket 2, the panel-side bracket 2 encounters rotational resistance from the trim 4 with no bias in the rotational direction. For this reason, mounting rotational operation of the panel-side bracket 2 can be achieved in a smooth fashion. Particularly, during mounting operation of the trim 4 with an increased thickness, the panel-side bracket 2 encounters large rotational resistance which is effective for mounting. Also, with the presently filed embodiment, although the hook portions 8 and the resilient catch-up blades 15 are located at the two opposing positions angled at 180 degrees along the rotational direction, it is, of course, to be noted that these components may be also, located in equidistantly spaced areas at more than three positions.

Moreover, with the presently filed embodiment, although the bracket coupling structure of the present invention is applied to the vehicle-body mounting bracket 1 in a case where the sunvisor is mounted, it is, of course, to be noted that the bracket coupling structure of the present invention can be applied to a mounting structure of an auxiliary unit other than the sunvisor and the other structure than the vehicle-body mounting bracket 1.

As set forth above, according to the present invention, in a case where the mounting objective plate body has the thickness greater than the deviation dimension between the base plate of the bracket and the hook portion, since when the bracket is rotated, the resilient catch-up blades urge the mounting objective plate body in the compressing direction to cause compression and deformation while causing the hook portions to slide over the surface of the mounting objective plate body and engage the peripheral edge of the mounting opening of the mounting objective plate body, the bracket can be fixed in place even in the presence of the mounting objective plate body with the thickness above the given value. In a case where the thickness of the mounting objective plate body is substantially equal to the deviation dimension between the base plate of the bracket and the hook portion, when the bracket is rotated, the hook portions slide on the surface of the mounting objective plate body and engage the peripheral edge of the mounting opening of the mounting objective plate body.

Further, according to the present invention, in addition to the advantageous effects mentioned above, under a situation where the visor-side bracket is mounted, since the resilient catch-up blades urges the visor-side bracket at all times with the reaction force caused by resilient returning movement, the screw loosening effect is provided that precludes the tightening screws, which couples the visor-side bracket to be coupled to the panel, from being loosened and, even if, for instance, the coupling screws are loosened and advantages result in a rickety movement blocking effect and in an abnormal sound blocking effect.

Further, according to the present invention, in addition to the advantageous effects discussed above, since rotational resistance is encountered from the mounting objective plate body with no bias in the rotational direction during mounting rotational operation of the bracket, mounting rotational operation of the bracket can be smoothly accomplished. Especially, during assembly of the mounting objective plate body with the increased thickness, relatively large rotational resistance is encountered which is effective for assembly.

Additionally, according to the present invention, in addition to the advantageous effects described above, due to an ability of complete engagement between the visor-side connector section of the visor-side bracket and the panel-side connector section of the panel-side bracket, electrical connection can be provided between the visor-side bracket and the panel-side bracket.

According to the present invention, when rotating the bracket in the mounting rotational direction with the respective book portions of the bracket being inserted through the mounting opening of the mounting objective plate body, the bracket is allowed to rotate while suffering small rotational resistances from the reverse-rotation interrupt protrusions whereby the bracket can be rotated to the rotating complete position such that after the bracket has been mounted, if the bracket undergoes an external force in a reverse rotational direction, increased rotational resistances act on the bracket due to the reverse-rotation interrupt protrusions to avoid the bracket from being reversely rotated. Accordingly, no reverse rotation of the bracket occurs after mounting and the bracket is enabled to remain in the rotating complete position.

Moreover, according to the present invention, in addition to the advantageous effects described above, in a case where the mounting objective plate body includes the trim, since the reverse-rotation interrupt protrusions intrude the facing, which is easy for the trim to intrude, of the trim when the bracket is subjected to the external forces in the dismounting rotational direction, reverse rotation of the bracket can be reliably avoided.

Furthermore, according to the present invention, in addition to the advantageous effects described above, during mounting rotational operation of the bracket, since only small rotational resistances resulting from the plural reverse-rotation interrupt protrusions act on the bracket with no bias in the is rotational direction, no interference occurs in smooth mounting rotational operation of the bracket. Also, when the bracket encounters the external force in the reverse rotational direction after the bracket being mounted, the bracket can be subjected to the influence of large rotational resistances, resulting from the reverse-rotation interrupt protrusions, with no bias in the rotational direction of the bracket, reverse rotation of the bracket can be reliably avoided.

According to the present invention, during mounting rotation of the bracket, if the bracket is rotated from the rotating start position to the rotating complete position, the peripheral edge of the mounting opening progressively intrudes the centering ribs such that at the rotating complete position, the bracket is retained under a condition where the peripheral edge of the mounting opening intrudes the centering ribs at plural locations whereby when the bracket encounters the external force in the reverse rotational direction, the bracket suffers from large rotational resistances due to the intrusion of the peripheral edge of the mounting opening and the bracket is prevented from being reversely rotated. Accordingly, no reverse rotation of the bracket occurs after mounting and the bracket can be retained at the rotating complete position. Also, during a rotational phase where the bracket travels from the rotating start position to the rotating complete position, if the bracket shifts in the radial direction from the rotation center, a discrepancy takes place in the intrusion of the peripheral edge of the mount position with respect to the centering ribs at the shifted side and the centering ribs at the counter-shifted side, and the presence of a resulting discrepancy causes the bracket to be pushed back to the rotation center whereby the bracket can be mounted under the condition where the bracket is centered at the center of the mounting opening.

Further, according to the present invention, in addition to the above-described advantageous effect, since the centering ribs, prevailing in the rotating leading side, among the pair of centering ribs undergo the maximum rotational resistances at the positions in front of the areas where the bracket reaches the rotating complete position and, at the rotating complete position of the bracket, these components bear smaller rotational resistances than the maximum rotational resistances, a sense of snapping action can be obtained during rotational operation of the bracket. Also, due to the presence of the bracket bearing the maximum rotational resistances at the areas in front of the rotating complete position, an advantage is provided to preclude the bracket from being reversely rotated.

Further, according to the present invention, in addition to the advantageous effects described above, during mounting rotational operation of the bracket, the bracket is subject to the centering forces, resulting from the plural centering ribs, with no bias in the rotational direction, the bracket can be centered at a high precision.

The entire content of Japanese Patent Application No. P2002-277822 with a filing date of Sep. 24, 2002 and No. P2002-277814 with a same filing date are herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A bracket coupling structure for coupling a bracket to a mounting objective plate body, comprising:

hook portions disposed on at least two positions of a base plate of the bracket and having L-shape cross sections directed outward, respectively, with respect to a rotation center of the bracket; and resilient catch-up blades disposed on distal ends, facing in mounting rotational direction, of the hook portions and sloped in directions to be separate away from the base plate toward an upstream of the mounting rotational direction;

wherein the resilient catch-up blades are urged to the mounting objective plate body during rotation of the bracket in the mounting rotational direction under a condition where the bracket is inserted to a mounting opening of the mounting objective plate body.

2. The bracket coupling structure according to claim 1, wherein the bracket includes a connector section.

3. The bracket coupling structure according to claim 1, wherein the mounting objective plate body includes a trim that forms interior material of a panel, and the bracket includes a panel-side bracket fixedly secured to a mounting opening of the trim, with a visor-side bracket mounted to the panel allowing the resilient catch-up blades of the panel-side bracket to be urged onto the trim and resiliently deformed.

4. The bracket coupling structure according to claim 2, wherein the hook portions and the resilient catch-up blades, both disposed in plural positions, are located on equidistantly spaced positions on a rotating circumference.

5. The bracket coupling structure according to claim 3, wherein the panel-side bracket includes a panel-side connector section, and the visor-side bracket includes a visor-side connector section.

6. The bracket coupling structure according to claim 1, further comprising a reverse-rotation interrupt protrusion disposed on either one of surfaces of the base plate, with which a peripheral edge of the mounting opening of the mounting objective plate body is held in abutting engagement, and the hook portions for providing small rotational resistance during rotation in the mounting rotational direction and large rotational resistance during rotation in a dismounting rotational direction.

7. The bracket coupling structure according to claim 6, wherein the reverse-rotation interrupt protrusion includes a trailing wall, facing in the mounting rotational direction, formed in a sharp slope and a leading end wall, facing in the mounting rotational direction, formed in a gradual slope.

8. The bracket coupling structure according to claim 6, wherein the reverse-rotation interrupt protrusion is disposed on a surface of the hook portion.

9. The bracket coupling structure according to claim 6, wherein a plurality of the reverse-rotation interrupt protrusions are located on a plurality of equidistantly spaced positions on a rotating circumference.

10. The bracket coupling structure according to claim 1, wherein a distance between a rotation center of the bracket and an end face of the mounting opening is set to gradually decrease from a rotating start position toward a rotating complete position; and wherein the bracket coupling structure further comprises a centering rib disposed on either one of surfaces of the base plate, with which a peripheral edge of the mounting opening of the mounting objective plate body is held in abutting engagement, and the hook portions having a slope with a height that progressively increases from an outer peripheral side toward an inner peripheral side.

11. The bracket coupling structure according to claim 10, wherein mounting opening is formed such that the distance between the rotation center of the bracket and the end face of the mounting opening has the minimum distance at a rotating complete position, and a pair of left and right centering ribs are disposed on a plurality of locations and arranged such that at the rotating complete position of the bracket, the pair of left and right centering ribs assume positions slightly in front of a position slightly rotated far away from the rotating complete position.

12. The bracket coupling structure according to claim 10, wherein the centering rib is disposed on a surface of the base plate.

13. The bracket coupling structure according to claim 10, wherein a plurality of the centering ribs are disposed in equidistantly spaced positions on a rotating circumference.

14. The bracket coupling structure according to claim 1, wherein a distance between a rotation center of the bracket and an end face of the mounting opening is set to gradually decrease from a rotating start position toward a rotating complete position; and wherein the bracket coupling structure further comprises a reverse-rotation interrupt protrusion disposed on either one of surfaces of the base plate, with which a peripheral edge of the mounting opening of the mounting objective plate body is held in abutting engagement, and the hook portions for providing small rotational resistance during rotation in the mounting rotational direction and large rotational resistance during rotation in a dismounting rotational direction, and a centering rib disposed on either one of surfaces of the base plate, with which a peripheral edge of the mounting opening of the mounting objective plate body is held in abutting engagement, and the hook portions and having a slope with a height that progressively increases from an outer periphery side toward an inner peripheral side.

* * * * *